United States Patent
Guler et al.

(10) Patent No.: US 12,469,219 B2
(45) Date of Patent: Nov. 11, 2025

(54) HAND SURFACE NORMAL ESTIMATION

(71) Applicant: Snap Inc., Santa Monica, CA (US)

(72) Inventors: Riza Alp Guler, London (GB); Dominik Kulon, London (GB); Himmy Tam, London (GB); Haoyang Wang, London (GB)

(73) Assignee: SNAP INC., Santa Monica, CA (US)

( * ) Notice: Subject to any disclaimer, the term of this patent is extended or adjusted under 35 U.S.C. 154(b) by 156 days.

(21) Appl. No.: 18/179,717

(22) Filed: Mar. 7, 2023

(65) Prior Publication Data
US 2024/0303926 A1   Sep. 12, 2024

(51) Int. Cl.
*G06T 17/20*     (2006.01)
*G06T 7/40*      (2017.01)
*G06T 11/00*     (2006.01)

(52) U.S. Cl.
CPC ............. *G06T 17/20* (2013.01); *G06T 7/40* (2013.01); *G06T 11/00* (2013.01); *G06T 2200/24* (2013.01); *G06T 2207/10028* (2013.01); *G06T 2207/20081* (2013.01); *G06T 2207/30196* (2013.01); *G06T 2210/22* (2013.01); *G06T 2210/56* (2013.01)

(58) Field of Classification Search
None
See application file for complete search history.

(56) References Cited

U.S. PATENT DOCUMENTS

| | | | |
|---|---|---|---|
| 7,971,156 B2 | 6/2011 | Albertson et al. | |
| 7,996,793 B2 | 8/2011 | Latta et al. | |
| 8,487,938 B2 | 7/2013 | Latta et al. | |
| 8,856,691 B2 | 10/2014 | Geisner et al. | |
| 9,225,897 B1 | 12/2015 | Sehn et al. | |
| 9,230,160 B1 | 1/2016 | Kanter | |
| 9,276,886 B1 | 3/2016 | Samaranayake | |
| 9,705,831 B2 | 7/2017 | Spiegel | |

(Continued)

FOREIGN PATENT DOCUMENTS

| | | |
|---|---|---|
| CN | 103049761 | 8/2016 |
| CN | 107992858 A | 5/2018 |

(Continued)

OTHER PUBLICATIONS

Wan et al.; "Hand Pose Estimation from Local Surface Normals;" B. Leibe et al. (Eds.): ECCV 2016, Part III, LNCS 9907, pp. 554-569, 2016; Springer International Publishing AG; 2016 (Year: 2016).*

(Continued)

*Primary Examiner* — Edward Martello
(74) *Attorney, Agent, or Firm* — SCHWEGMAN LUNDBERG & WOESSNER, P.A.

(57) ABSTRACT

An system for augmenting images using hand surface normal estimation is provided. In a model training phase, 3D models of hands are generated using 3D data of hands in a variety of positions. Target normal training data is generated that includes normals of surfaces of the 3D models and synthetic 2D image training data corresponding to the 3D models and the normals. The target normal training data and the synthetic image training data are used to train a normal estimation model. The normal estimation is used by an interactive application to generate augmentations that are applied to hand image data.

20 Claims, 10 Drawing Sheets

(56) References Cited

U.S. PATENT DOCUMENTS

| | | |
|---|---|---|
| 9,742,713 B2 | 8/2017 | Spiegel et al. |
| 10,102,423 B2 | 10/2018 | Shaburov et al. |
| 10,284,508 B1 | 5/2019 | Allen et al. |
| 10,439,972 B1 | 10/2019 | Spiegel et al. |
| 10,509,466 B1 | 12/2019 | Miller et al. |
| 10,514,876 B2 | 12/2019 | Sehn |
| 10,579,869 B1 | 3/2020 | Xiong et al. |
| 10,591,730 B2 | 3/2020 | Rodriguez, II et al. |
| 10,614,855 B2 | 4/2020 | Huang |
| 10,748,347 B1 | 8/2020 | Li et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 11,307,747 B2 | 4/2022 | Dancie et al. |
| 11,531,402 B1 | 12/2022 | Stolzenberg |
| 11,546,505 B2 | 1/2023 | Canberk |
| 2009/0012788 A1 | 1/2009 | Gilbert et al. |
| 2011/0301934 A1 | 12/2011 | Tardif |
| 2014/0171036 A1 | 6/2014 | Simmons |
| 2015/0120293 A1 | 4/2015 | Wohlert et al. |
| 2015/0370320 A1 | 12/2015 | Connor |
| 2017/0123487 A1 | 5/2017 | Hazra et al. |
| 2017/0168586 A1* | 6/2017 | Sinha ................ G06N 20/00 |
| 2017/0277684 A1 | 9/2017 | Dharmarajan Mary |
| 2017/0277685 A1 | 9/2017 | Takumi |
| 2017/0351910 A1 | 12/2017 | Elwazer et al. |
| 2018/0158370 A1 | 6/2018 | Pryor |
| 2018/0300927 A1 | 10/2018 | Hushchyn et al. |
| 2019/0146219 A1 | 5/2019 | Rodriguez, II |
| 2020/0175759 A1* | 6/2020 | Russell ............. G06F 18/214 |
| 2020/0184721 A1 | 6/2020 | Ge et al. |
| 2020/0242779 A1* | 7/2020 | Deng ................ G06T 7/30 |
| 2021/0011612 A1 | 1/2021 | Dancie et al. |
| 2021/0074016 A1 | 3/2021 | Li et al. |
| 2021/0166732 A1 | 6/2021 | Shaburova et al. |
| 2021/0174034 A1 | 6/2021 | Retek et al. |
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0374993 A1 | 12/2021 | Guay et al. |
| 2021/0382564 A1 | 12/2021 | Blachly et al. |
| 2021/0397000 A1 | 12/2021 | Rodriguez, II |
| 2021/0405761 A1 | 12/2021 | Canberk |
| 2022/0188539 A1 | 6/2022 | Chan et al. |
| 2022/0206588 A1 | 6/2022 | Canberk et al. |
| 2022/0300730 A1 | 9/2022 | Eirinberg et al. |
| 2022/0300731 A1 | 9/2022 | Eirinberg et al. |
| 2022/0301231 A1 | 9/2022 | Eirinberg et al. |
| 2022/0326781 A1 | 10/2022 | Hwang et al. |
| 2022/0334649 A1 | 10/2022 | Hwang et al. |
| 2022/0375174 A1 | 11/2022 | Arya et al. |
| 2023/0026575 A1 | 1/2023 | Faaborg et al. |
| 2023/0169236 A1* | 6/2023 | Holz ................ G06F 3/017 703/2 |
| 2024/0095953 A1* | 3/2024 | Lyons ............... G06V 20/653 |
| 2024/0303843 A1 | 9/2024 | Guler et al. |

FOREIGN PATENT DOCUMENTS

| | | |
|---|---|---|
| EP | 3707693 | 9/2020 |
| EP | 4172726 | 5/2023 |
| EP | 4172730 | 5/2023 |
| KR | 20220158824 | 12/2022 |
| WO | 2016167947 | 10/2016 |
| WO | 2016168591 | 10/2016 |
| WO | 2019094618 | 5/2019 |
| WO | 2020069049 | 4/2020 |
| WO | 2022005687 | 1/2022 |
| WO | 2022005693 | 1/2022 |
| WO | 2022060549 | 3/2022 |
| WO | 2022066578 | 3/2022 |
| WO | 2022132381 | 6/2022 |
| WO | 2022146678 | 7/2022 |
| WO | 2022198182 | 9/2022 |
| WO | 2022216784 | 10/2022 |
| WO | 2022225761 | 10/2022 |
| WO | 2022245765 | 11/2022 |
| WO | 2024186758 | 9/2024 |
| WO | 2024186939 | 9/2024 |

OTHER PUBLICATIONS

"International Application Serial No. PCT/US2024/018394, International Search Report mailed Jun. 13, 2024", 5 pgs.

"International Application Serial No. PCT/US2024/018394, Written Opinion mailed Jun. 13, 2024", 6 pgs.

"International Application Serial No. PCT/US2024/018741, International Search Report mailed Jun. 27, 2024", 3 pgs.

"International Application Serial No. PCT/US2024/018741, Written Opinion mailed Jun. 27, 2024", 7 pgs.

David, Eigen, "Predicting Depth, Surface Normals and Semantic Labels with a Common Multi-Scale Convolutional Architecture", Ithaca, [Online]. Retrieved from the Internet: <https://openaccess.thecvf.com/content_iccv_2015/papers/Eigen_Predicting_Depth_Surface_ICCV_2015_paper.pdf>, (Dec. 17, 2015), 1-9.

Wang, Nanyang, "Pixel2mesh: Generating 3d mesh models from single rgb images", Proceedings of the European Conference on Computer Vision (ECCV); arXIv: 1804.01654v2 [cs.CV], (2018), 16 pgs.

Xiaojuan, Qi, "GeoNet: Geometric Neural Network for Joint Depth and Surface Normal Estimation", [Online]. Retrieved from the Internet: <https://xjqi.github.io/geonet.pdf>, (Jun. 2018), 1-9.

Xiaolong, Wang, "Designing deep networks for surface normal estimation", [Online]. Retrieved from the Internet: <:https://www.cs.cmu.edu/~xiaolonw/papers/deep3d.pdf>, (Jun. 2015), 1-9.

English Translation: CN-107992858-A, (2018), 17 pgs.

"U.S. Appl. No. 18/179,784, Non Final Office Action mailed May 28, 2025", 19 pgs.

* cited by examiner

HAND SURFACE NORMAL ESTIMATION

TECHNICAL FIELD

The present disclosure relates generally to image processing and more particularly to the processing of 2D and 3D images.

BACKGROUND

Users of interactive platforms enjoy sharing images of themselves and their friends. Their enjoyment is enhanced when they can add augmentations to images.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
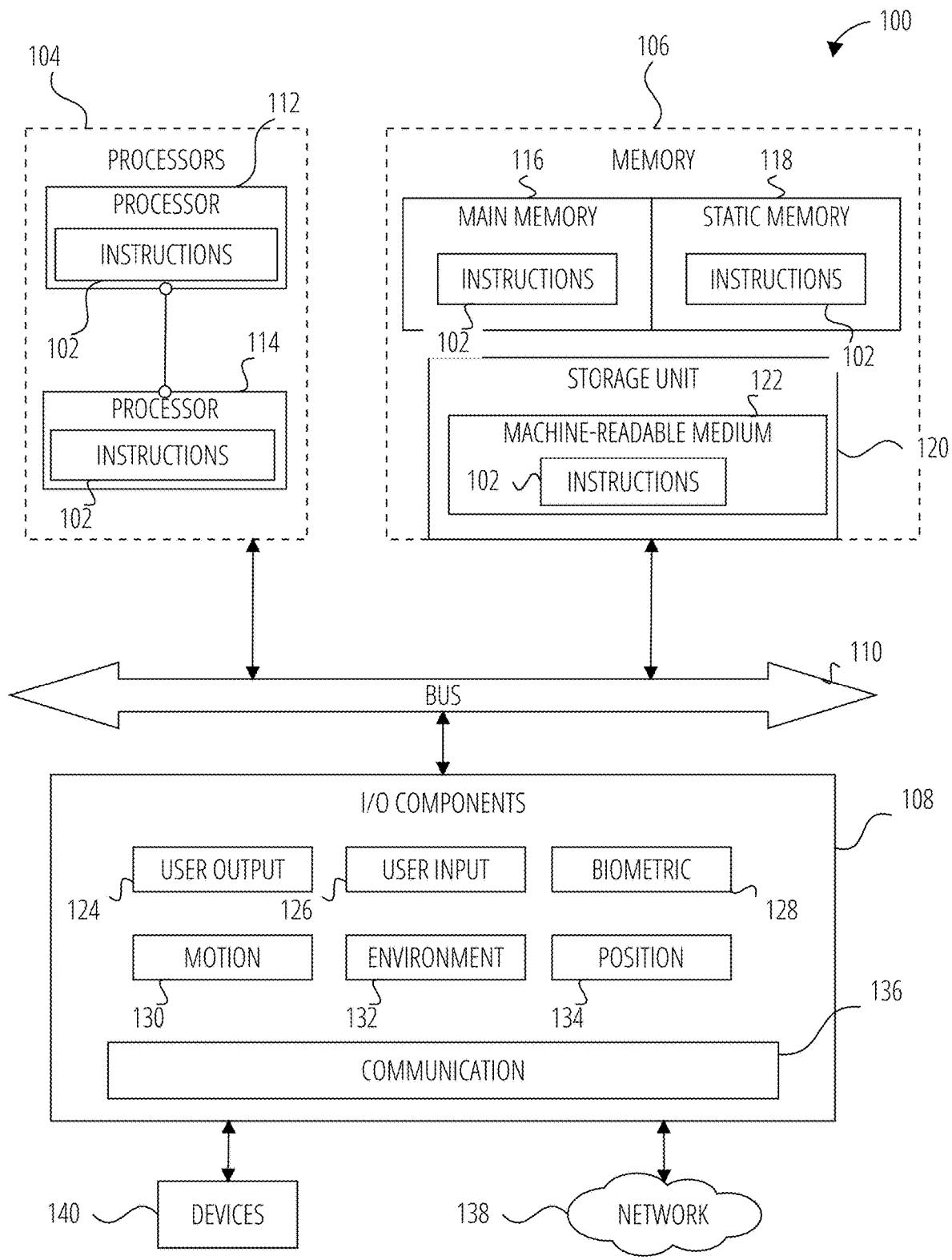
FIG. 1 is a diagrammatic representation of a machine in the form of a computer system within which a set of instructions may be executed to cause the machine to perform any one or more of the methodologies discussed herein, according to some examples.

When users of an interactive platform share images of themselves and/or their friends, they may add augmentations to those images. These augmentations may take many forms, such as by adding earrings to a user's image, adding amusing hats or other garments, and changing an appearance of an outer surface of a portion of the user's image. For example, a user may want to appear as if they are made of a metallic material that is shiny or that they are covered with fur. To achieve this effect, one or more portions of a 3D model of the user's body are rendered using a 3D texture applied to a surface of the 3D model. In order to achieve a realistic appearance rendering of the surface using the texture, 3D rays perpendicular or normal to the modeled 3D surface (termed a "normal" in the singular or "normals" in the plural) are determined. The normals used during the rendering process to determine lighting and shading effects are used to give the rendered image a realistic 3D effect when displayed as a 2D image on a 2D display screen or the like. Conventional systems rely on having 3D models available for the rendering. In some instances, 3D models require large amounts of memory storage which is not practical for mobile devices such as smartphones and the like. In addition, generation and manipulation of the 3D model may require a large amount of computational resources that make it difficult to generate rendered images in real time for videos and the like.

The present disclosure pertains to methodologies to estimate normals for portions of a human body such as, but not limited to, hands, based on 2D image data. Accordingly, 3D information sufficient for generating 2D image augmentations on 2D images of 3D objects may be conveniently extracted from 2D image data. Augmentations may then be created quickly for images while reducing computational load of a processing system used to generate the augmentation. Estimated normals are used to generate renderings of the hand using 3D textures to give the hand appearance that it is composed of different materials. These renderings are used to create augmentations of the hand that can be displayed to a user of an interactive platform or the like.

In some examples, a synthetic image training data generation method includes receiving 3D data of a hand and generating a 3D model of the hand based on the 3D data where the 3D model includes a set of surfaces. The method further includes generating target normal training data including a set of normals of the set of surfaces of the 3D model and generating synthetic 2D image training data including a set of synthetic 2D images based on the 3D model and the set of normals. The method further includes training a normal estimation model based on the synthetic 2D image training data and the target normal training data.

In use, an interactive system captures image data of a hand in a real-world scene and generates a set of estimated normals based on the image data and the normal estimation model. The interactive system generates augmented image data based on the set of estimated normals and the image data and provides an augmented image to a user in a user interface based on the augmented image data.

Other technical features may be readily apparent to one skilled in the art from the following figures, descriptions, and claims.

Machine Architecture

FIG. 1 is a diagrammatic representation of the machine 100 within which instructions 102 (e.g., software, a program, an application, an applet, an app, or other executable code) for causing the machine 100 to perform any one or more of the methodologies discussed herein may be executed. For example, the instructions 102 may cause the machine 100 to execute any one or more of the methods described herein. The instructions 102 transform the general, non-programmed machine 100 into a particular machine 100 programmed to carry out the described and illustrated functions in the manner described. The machine 100 may operate as a standalone device or may be coupled (e.g., networked) to other machines. In a networked deployment, the machine 100 may operate in the capacity of a server machine or a client machine in a server-client network environment, or as a peer machine in a peer-to-peer (or distributed) network environment. The machine 100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 102, sequentially or otherwise, that specify actions to be taken by the machine 100. Further, while a single machine 100 is illustrated, the term "machine" shall also be taken to include a collection of machines that individually or jointly execute the instructions 102 to perform any one or more of the methodologies discussed herein. The machine 100, for example, may comprise the computing system 602 or any one of multiple server devices forming part of the interaction server system 610. In some examples, the machine 100 may also comprise both client and server systems, with certain operations of a particular method or algorithm being performed on the server-side and with certain operations of the particular method or algorithm being performed on the client-side.

The machine 100 may include processors 104, memory 106, and input/output I/O components 108, which may be configured to communicate with each other via a bus 110. In an example, the processors 104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 112 and a processor 114 that execute the instructions 102. The term "processor" is intended to include multi-core processors that may comprise two or more independent processors (sometimes referred to as "cores") that may execute instructions contemporaneously. Although FIG. 1 shows multiple processors 104, the machine 100 may include a single processor with a single-core, a single processor with multiple cores (e.g., a multi-core processor), multiple processors with a single core, multiple processors with multiples cores, or any combination thereof.

The memory 106 includes a main memory 116, a static memory 118, and a storage unit 120, both accessible to the processors 104 via the bus 110. The main memory 106, the static memory 118, and storage unit 120 store the instructions 102 embodying any one or more of the methodologies or functions described herein. The instructions 102 may also reside, completely or partially, within the main memory 116, within the static memory 118, within machine-readable medium 122 within the storage unit 120, within at least one of the processors 104 (e.g., within the processor's cache memory), or any suitable combination thereof, during execution thereof by the machine 100.

The I/O components 108 may include a wide variety of components to receive input, provide output, produce output, transmit information, exchange information, capture measurements, and so on. The specific I/O components 108 that are included in a particular machine will depend on the type of machine. For example, portable machines such as mobile phones may include a touch input device or other such input mechanisms, while a headless server machine will likely not include such a touch input device. It will be appreciated that the I/O components 108 may include many other components that are not shown in FIG. 1. In various examples, the I/O components 108 may include user output components 124 and user input components 126. The user output components 124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 108 may include biometric components 128, motion components 130, environmental components 132, or position components 134, among a wide array of other components. For example, the biometric components 128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The motion components 130 include acceleration sensor components (e.g., accelerometer), gravitation sensor components, rotation sensor components (e.g., gyroscope). In some examples, the motion components 130 are incorporated into an Inertial Measurement Unit (IMU)

The environmental components 132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), depth or distance sensors (e.g., sensors to determine a distance to an object or a depth in a 3D coordinate system of features of an object), or other components that may provide indications, measurements, or signals corresponding to a surrounding physical environment.

With respect to cameras, the computing system 602 may have a camera system comprising, for example, front cameras on a front surface of the computing system 602 and rear cameras on a rear surface of the computing system 602. The front cameras may, for example, be used to capture still images and video of a user of the computing system 602 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the computing system 602 may also include a 360° camera for capturing 360° photographs and videos.

Further, the camera system of the computing system 602 may include dual rear cameras (e.g., a primary camera as well as a depth-sensing camera), or even triple, quad or penta rear camera configurations on the front and rear sides of the computing system 602. These multiple cameras systems may include a wide camera, an ultra-wide camera, a telephoto camera, a macro camera, and a depth sensor, for example.

The position components 134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 108 further include communication components 136 operable to couple the machine 100 to a network 138 or devices 140 via respective coupling or connections. For example, the communication components 136 may include a network interface component or another suitable device to interface with the network 138. In further examples, the communication components 136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 140 may be another machine or any of a wide variety of peripheral devices (e.g., a peripheral device coupled via a USB).

Moreover, the communication components 136 may detect identifiers or include components operable to detect identifiers. For example, the communication components 136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 136, such as location via Internet Protocol (IP) geolocation, location via Wi-Fi® signal triangulation, location via detecting an NFC beacon signal that may indicate a particular location, and so forth.

The various memories (e.g., main memory 116, static memory 118, and memory of the processors 104) and storage unit 120 may store one or more sets of instructions and data structures (e.g., software) embodying or used by any one or more of the methodologies or functions described herein. These instructions (e.g., the instructions 102), when executed by processors 104, cause various operations to implement the disclosed examples.

The instructions 102 may be transmitted or received over the network 138, using a transmission medium, via a network interface device (e.g., a network interface component included in the communication components 136) and using any one of several well-known transfer protocols (e.g., hypertext transfer protocol (HTTP)). Similarly, the instructions 102 may be transmitted or received using a transmission medium via a coupling (e.g., a peer-to-peer coupling) to the devices 140.

Figure 2A:
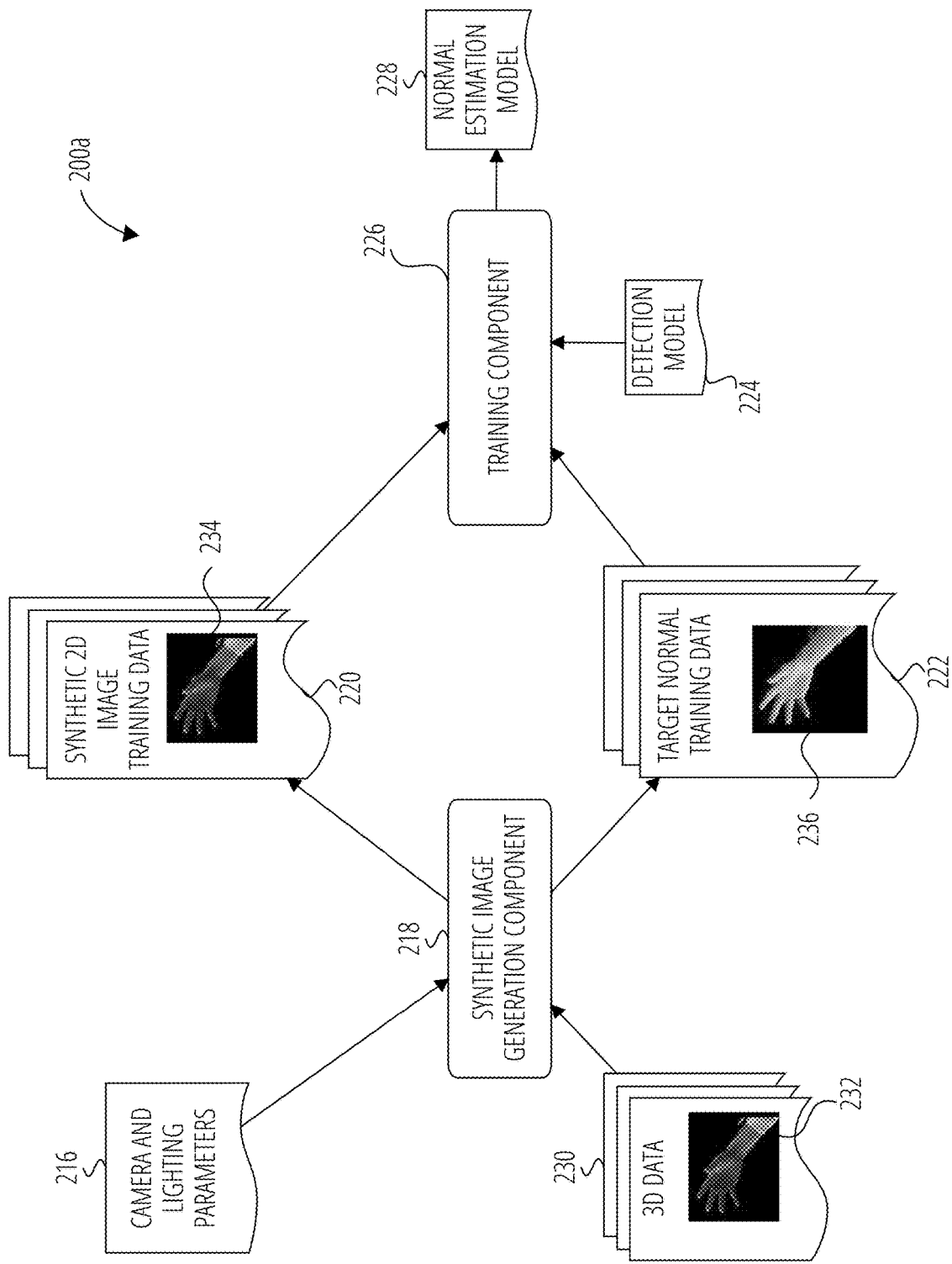
FIG. 2A is a data flow diagram of data flow during a normal estimation model generation process, according to some examples.
Figure 2B:
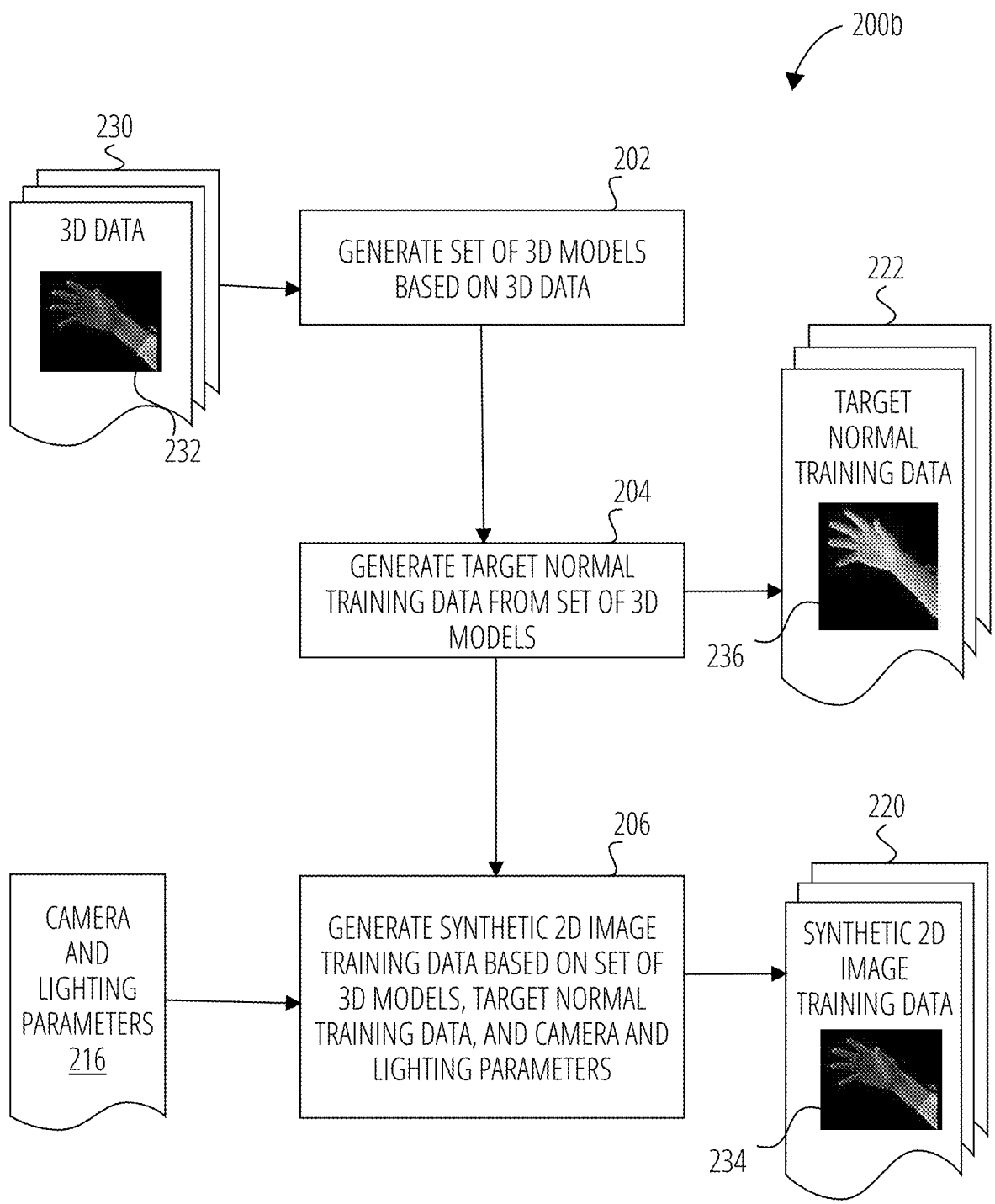
FIG. 2B is an activity diagram of a synthetic image training data generation method, according to some examples.
Figure 2C:
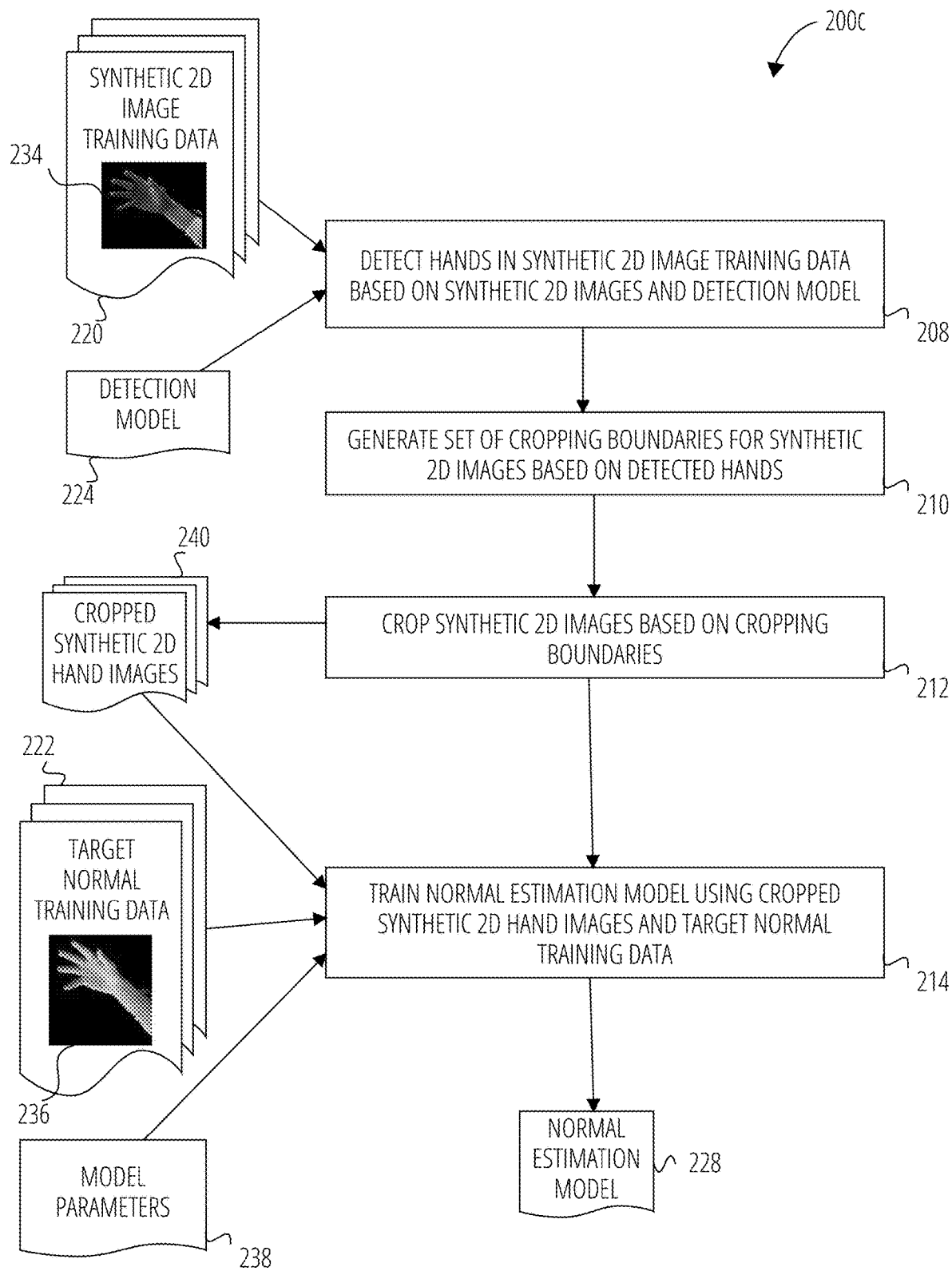
FIG. 2C is an activity diagram of a normal estimation model training method, according to some examples.

FIG. 2A is a data flow diagram of normal estimation model generation data flow 200a during a normal estimation model generation process, FIG. 2B is an activity diagram of a synthetic image training data generation method 200b, and FIG. 2C is an activity diagram of a normal estimation model training method 200c, according to some examples. The normal estimation model generation process is used by a data processing system, such as machine 100, to generate a normal estimation model 228 used to estimate hand normals used for generating augmented images of hands.

Referring to FIG. 2B, in operation 202, a synthetic image generation component 218 of the machine 100 receives 3D data 230 of a hand 232 in various poses (positions). In some examples, the 3D data comprises a set of 3D scans of the hand 232 in the various poses. The 3D scans me be generated using a variety of methodologies. In some examples, the 3D scans are point clouds comprised of a set of 3D points identified in a 3D coordinate system. A point cloud may be generated by any number of 3D scanning methodologies such as, but not limited to, contact based scanning using a physical contact probe, laser triangulation either scanned or point lasers, structured light scanning, time of flight scanning, photogrammetry, and the like.

The synthetic image generation component 218 generates a set of 3D models based on the set of 3D scans of the 3D data 230. For example, for each 3D scan of the 3D data 230, the synthetic image generation component 218 generates a respective 3D model comprising a set of surfaces or faces and a set of vertices defined by the intersections of the faces. For example, the 3D scan comprises a point cloud comprising a set of 3D points captured from the hand 232 and the synthetic image generation component 218 generates a mesh from the 3D points of the point cloud. Each surface of the set of surfaces is generated from a subset of 3D points selected from the point cloud. In some examples, the 3D model is a point cloud comprised of 3D points. In some examples, the 3D points of the 3D model are comprised of an average of a subset of 3D points of a point cloud comprising a 3D scan.

In operation 204, the synthetic image generation component 218 generates target normal training data 222 comprised of sets of normals, such as set of normals 236, based on the set of 3D models. For example, for each surface of a set of surfaces comprising a 3D model, the synthetic image generation component 218 generates a ray having as its origin point a 3D point on the surface of the 3D model with the ray being perpendicular to the surface and projecting outward from the 3D model. In some examples, a 3D model comprises a point cloud and the synthetic image generation component 218, for each 3D point of the point cloud, generates a ray having its origin at the 3D point of the point cloud with the ray projecting outward away from the 3D model perpendicular to a plane defined by at least three of the 3D points comprising the point cloud of the 3D model.

In operation 206, the synthetic image generation component 218 generates synthetic 2D image training data 220 comprised of a set of synthetic 2D images, such as synthetic 2D image 234, of the hand 232, based on the set of 3D models, the target normal training data 222, and a set of camera and lighting parameters 216. For example, the synthetic image generation component 218 applies a texture to the 3D model based on a specified lighting angle and lighting level. The synthetic image generation component 218 projects the textured 3D model onto a 2D plane to generate the 2D image based on a specified camera angle and camera distance from the 3D model. In some examples, a plurality of combinations of lighting levels, lighting angles, camera angles, and camera distances are used to create a plurality of synthetic 2D images from each 3D model. In some examples, the values of the lighting levels, lighting angles, camera angles, and camera distances are randomized. At the completion of the generation process, the synthetic 2D image training data 220 simulates images of a variety of hands as if the images were captured of the hands using physical cameras from a variety of camera angles, camera distances, lighting angles, and lighting levels.

The target normal training data 222 and the synthetic 2D image training data 220 generated by the synthetic image generation component 218 are used to train a normal estimation model 228 as more fully described in reference to FIG. 2C.

In some examples, the 3D data 230 comprises scans of a physical object other than a hand. Accordingly, the target normal training data 222 and the synthetic 2D image training data 220 are not related to a hand, but to the physical object. The physical object may be any type of physical object that is amenable to 3D scanning.

In some examples, the 3D data 230 is not of a hand but of another appendage or portion of the human body such as, but not limited to, an arm, a leg, a foot, a head, or the like. Accordingly, the target normal training data 222 and the synthetic 2D image training data 220 are not related to a hand, but to the portion of the human body.

Referring to FIG. 2C, in operation 208, a training component 226 of machine 100 receives the synthetic 2D image training data 220 comprising the set of synthetic 2D images, such as synthetic 2D image 234, and detects a location in each synthetic 2D image of a hand. For example, the training component 226 detects a location of a hand in the synthetic 2D image using computer vision methodologies including, but not limited to, Harris corner detection, Shi-Tomasi corner detection, Scale-Invariant Feature Transform (SIFT), Speeded-Up Robust Features (SURF), Features from Accelerated Segment Test (FAST), Oriented FAST and Rotated BRIEF (ORB), and the like.

In some examples, the training component 226 detects the location of the hand using artificial intelligence methodologies and a detection model 224 previously generated using machine learning methodologies. In some examples, the detection model 224 comprises, but is not limited to, a neural network, a learning vector quantization network, a logistic regression model, a support vector machine, a random decision forest, a naïve Bayes model, a linear discriminant analysis model, a K-nearest neighbor model, and the like. In some examples, machine learning methodologies may include, but are not limited to, supervised learning, unsupervised learning, semi-supervised learning, reinforcement learning, dimensionality reduction, self-learning, feature learning, sparse dictionary learning, anomaly detection, and the like.

In operation 210, the training component 226, generates a set of cropping boundaries such as, but not limited to, a boundary box, based on detecting the location of the hand in synthetic 2D image. For example, in a synthetic 2D image comprised of pixels organized in rows and columns, the training component 226 determines a leftmost pixel of the pixels comprising the hand and sets a left boundary one pixel column to the left of the leftmost pixel. In a similar manner, the training component 226 determines a topmost pixel of the pixels comprising the hand and sets an upper cropping boundary one row above the topmost pixel, determines a bottommost pixel and sets a lower cropping boundary one row below the bottommost pixel, and determines a rightmost pixel and sets a right cropping boundary one pixel column to the right of the rightmost pixel.

In operation 212, the training component 226 generates cropped synthetic 2D hand images 240 by cropping the synthetic 2D image based on the cropping boundaries. For example, the training component 226 crops out all of the pixels in the synthetic 2D image to the left of the left cropping boundary, to the right of the right cropping boundary, above the upper cropping boundary, and below the lower cropping boundary.

In operation 214, the training component 226 generates a normal estimation model 228 based on training data comprising the paired input-output training data sets of the cropped synthetic 2D hand images 240 and the target normal training data 222. For example, model parameters 238 provide parameters or coefficients of the normal estimation model 228. During training, these model parameters 238 are adapted based on the input-output training pairs of the the cropped synthetic 2D hand images 240 and the target normal training data 222. After the model parameters 238 are adapted (after training), the model parameters 238 are used by the training component 226 to generate the trained machine learning normal estimation model 228.

The training component 226 trains the normal estimation model 228 based on the sets of input-output pairs of the cropped synthetic 2D hand images 240 and the target normal training data 222. For example, the training component 226 may train the normal estimation model 228 by minimizing a loss function based on comparing a sets of estimated normals to the sets of normals 236 of the target normal training data 222. The normal estimation model 228 can include any one or combination of classifiers or neural networks, such as an artificial neural network, a convolutional neural network, an adversarial network, a generative adversarial network, a deep feed forward network, a radial basis network, a recurrent neural network, a long/short term memory network, a gated recurrent unit, an auto encoder, a variational autoencoder, a denoising autoencoder, a sparse autoencoder, a Markov chain, a Hopfield network, a Boltzmann machine, a restricted Boltzmann machine, a deep belief network, a deep convolutional network, a deconvolutional network, a deep convolutional inverse graphics network, a liquid state machine, an extreme learning machine, an echo state network, a deep residual network, a Kohonen network, a support vector machine, a neural Turing machine, and the like.

The result of minimizing the loss function for multiple sets of paired cropped synthetic 2D hand images 240 and target normal training data 222 trains, adapts, or optimizes the model parameters 238 of the normal estimation model 228. In this way, the normal estimation model 228 is trained to generate sets of estimated normals based on image data of a one or more hands.

Figure 3:
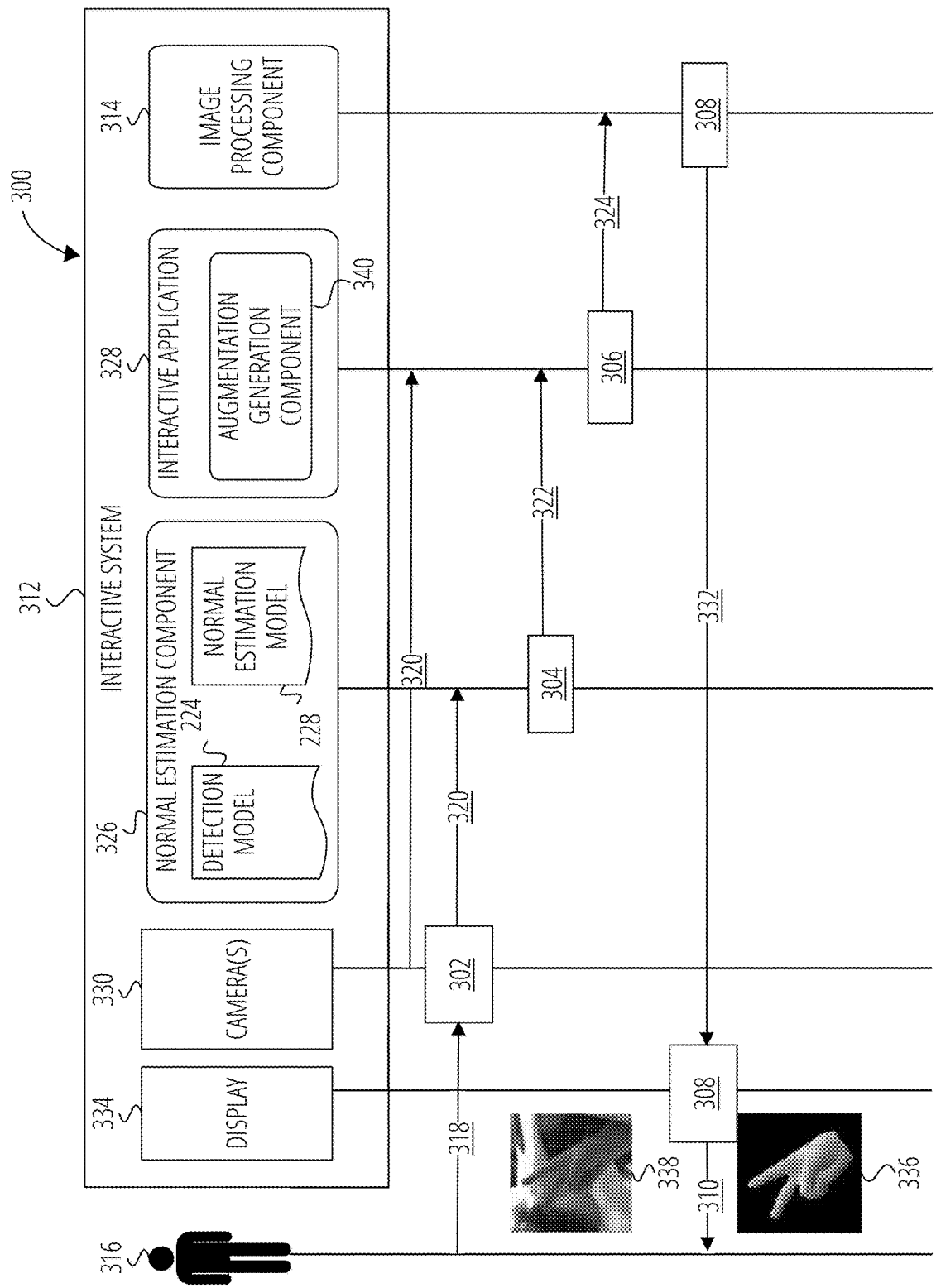
FIG. 3 is a sequence diagram illustrating an augmentation method utilizing a normal estimation model to generate an augmented image, according to some examples.

The hand detection model 224 and the normal estimation model generated by the training component 226 are used in an image augmentation method as more fully described in reference to FIG. 3.

FIG. 3 is a sequence diagram illustrating an augmentation method 300 utilizing a normal estimation model 228 to generate an augmented image, such as augmented image 336 of a user interface, in accordance with some examples. An interactive system 312 uses the augmentation method 300 to provide an augmented user interface 310 of an interactive application 328 to a user 316. The interactive application 328 provides the augmented user interface 310 to the user 316 allowing the user to create and view an augmented image, such as augmented image 336.

In operation 302, interactive application 328 uses one or more cameras 330 of the interactive system 312 to capture image data 320 of a real-world scene 318 comprising one or more hands 338 within the real-world scene 318. The one or more cameras 330 communicate the image data 320 to a normal estimation component 326 and to the interactive application 328.

In operation 304, the normal estimation component 326 receives the image data 320. The normal estimation component 326 generates a set of estimated normals 322 for each image in the image data 320 that include a hand based on the image data 320, the detection model 224, and the normal estimation model 228. For example, the normal estimation component 326 detects a location of a hand in an image of the image data 320 using the detection model 224 as described in reference to training the normal estimation model 228. The normal estimation component 326 generates a set of cropping boundaries and uses the set of cropping boundaries to crop the image as described in reference to training the normal estimation model 228. The normal estimation component 326 then generates the set of estimated normals 322 based on the cropped image data and the normal estimation model 228 using artificial intelligence methodologies as more fully described in reference to the training of the normal estimation model 228. The normal estimation component 326 communicates the set of estimated normals 322 to the interactive application 328.

In operation 306, the interactive application 328 receives the set of estimated normals 322 and generates augmented image data 324 based on the set of estimated normals 322 using an augmentation generation component 340. For example, the set of estimated normals 322 is of the hand image data of the hand 338 in the real-world scene 318. Each normal of the set of estimated normals 322 is comprised of a ray having a 3D point as an origin point. A set of origin points of the normals comprise a 3D point cloud defining surfaces of the hand 338 in a 3D coordinate system. The vectors of the rays indicate a direction that is orthogonal to a surface of the hand 338 in the 3D coordinate system. Accordingly, the set of estimated normals 322 comprise a partial 3D model to which the augmentation generation component 340 applies a texture and projects a 2D render of the textured 3D model onto a 2D plane of the image data 320 at the location of the hand 338 in the image data 320, thus applying an augmentation to the hand's image data to create an augmented image 336. The interactive application 328 communicates augmented image data 324 of the augmented image 336 to an image processing component 314 of the interactive system 312.

In some examples, the image data 320 comprises images having pixels and the normal estimation component 326 generates a set of estimated normals 322 where each pixel of the image data of the hand 338 has a respective normal in the set of estimated normals 322.

In operation 308, the image processing component 314 receives the augmented image data 324 from the interactive application 328. The image processing component 314 generates user interface data 332 of the augmented user interface 310 based on the augmented image data 324. The image processing component 314 provides the augmented user interface 310 including the augmented image 336 to the user 316 via a display 334 of the interactive system 312 based on the user interface data 332.

In some examples, the augmented image 336 includes an image that is generated and overlaid on an image of the original image data 320 at a location in the image where the hand 338 is located. For example, the augmentation generation component 340 may generate an image of the hand being covered in a glove or the like. In some examples, the hand 338 is overlaid with a generated image in the form of a cartoon animal paw for comedic effect. In some examples, the hand 338 is enlarged or made smaller. In some examples, the hand 338 is overlaid with an image of the hand 338 having a different surface texture other than skin, such as a shine metallic texture or the like.

In some examples, the interactive system 312 continuously repeats the operations of the augmentation method 300 to provide the augmented user interface 310 in real-time to the user 316.

In some examples, the operations of the interactive application 328 are distributed across a network. For example, the interactive application 328 is a web application connected to a server via a network such as the internet. The interactive application 328 communicates the image data 320 to the server and the server generates the augmented image data 324 and communicates the augmented image data 324 to the interactive application 328 via the network.

In some examples, the interactive application 328 composites the image data 320 and the augmented image data 324 and communicates the composited video frame data to the image processing component 314. The image processing component 314 receives the composited video frame data and generates the user interface data 332 based on the composited video frame data.

System with Head-Wearable Apparatus

Figure 4:
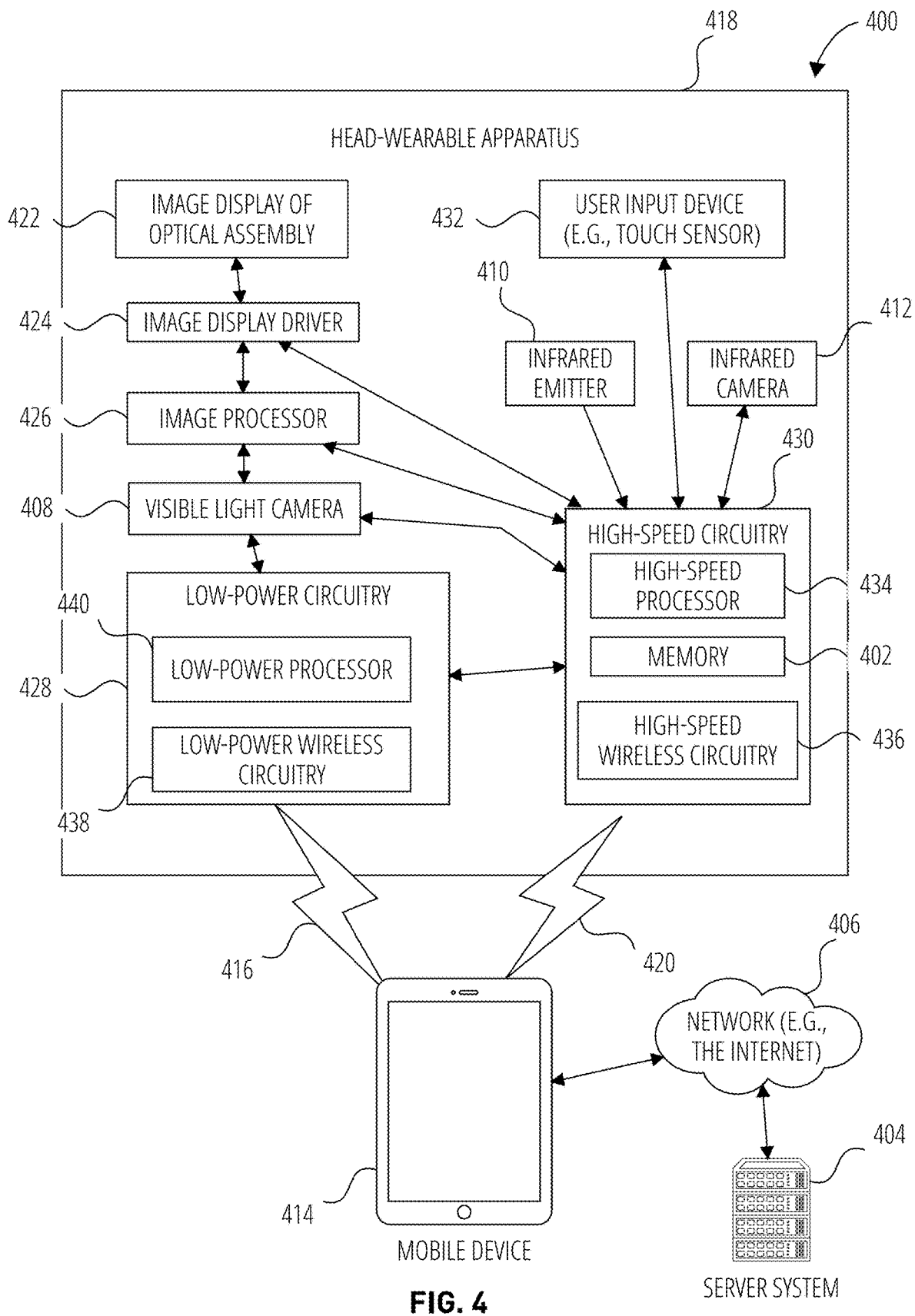
FIG. 4 illustrates a system of a head-wearable apparatus, according to some examples.

FIG. 4 illustrates a system 400 including a head-wearable apparatus 418 with a selector input device, according to some examples. FIG. 4 is a high-level functional block diagram of an example head-wearable apparatus 418 communicatively coupled to a mobile device 414 and various server systems 404 (e.g., the interaction server system 610) via various networks 608.

The head-wearable apparatus 418 includes one or more cameras, each of which may be, for example, a visible light camera 408, an infrared emitter 410, and an infrared camera 412.

The mobile device 414 connects with head-wearable apparatus 418 using both a low-power wireless connection 416 and a high-speed wireless connection 420. The mobile device 414 is also connected to the server system 404 and the network 406.

The head-wearable apparatus 418 further includes two image displays of the image display of optical assembly 422. The two image displays of optical assembly 422 include one associated with the left lateral side and one associated with the right lateral side of the head-wearable apparatus 418. The head-wearable apparatus 418 also includes an image display driver 424, an image processor 426, low-power circuitry 428, and high-speed circuitry 430. The image display of optical assembly 422 is for presenting images and videos, including an image that can include a graphical user interface to a user of the head-wearable apparatus 418.

The image display driver 424 commands and controls the image display of optical assembly 422. The image display driver 424 may deliver image data directly to the image display of optical assembly 422 for presentation or may convert the image data into a signal or data format suitable for delivery to the image display device. For example, the image data may be video data formatted according to compression formats, such as H.264 (MPEG-4 Part 10), HEVC, Theora, Dirac, Real Video RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 418 includes a frame and stems (or temples) extending from a lateral side of the frame. The head-wearable apparatus 418 further includes a user input device 432 (e.g., touch sensor or push button), including an input surface on the head-wearable apparatus 418. The user input device 432 (e.g., touch sensor or push button) is to receive from the user an input selection to manipulate the graphical user interface of the presented image.

The components shown in FIG. 4 for the head-wearable apparatus 418 are located on one or more circuit boards, for example a PCB or flexible PCB, in the rims or temples. Alternatively, or additionally, the depicted components can be located in the chunks, frames, hinges, or bridge of the head-wearable apparatus 418. Left and right visible light cameras 408 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 418 includes a memory 402, which stores instructions to perform a subset or all of the functions described herein. The memory 402 can also include storage device.

As shown in FIG. 4, the high-speed circuitry 430 includes a high-speed processor 434, a memory 402, and high-speed wireless circuitry 436. In some examples, the image display driver 424 is coupled to the high-speed circuitry 430 and operated by the high-speed processor 434 in order to drive the left and right image displays of the image display of optical assembly 422. The high-speed processor 434 may be any processor capable of managing high-speed communications and operation of any general computing system needed for the head-wearable apparatus 418. The high-speed processor 434 includes processing resources needed for managing high-speed data transfers on a high-speed wireless connection 420 to a wireless local area network (WLAN) using the high-speed wireless circuitry 436. In certain examples, the high-speed processor 434 executes an operating system such as a LINUX operating system or other such operating system of the head-wearable apparatus 418, and the operating system is stored in the memory 402 for execution. In addition to any other responsibilities, the high-speed processor 434 executing a software architecture for the head-wearable apparatus 418 is used to manage data transfers with high-speed wireless circuitry 436. In certain examples, the high-speed wireless circuitry 436 is configured to implement Institute of Electrical and Electronic Engineers (IEEE) 802.11 communication standards, also referred to herein as WiFi. In some examples, other high-speed communications standards may be implemented by the high-speed wireless circuitry 436.

The low-power wireless circuitry 438 and the high-speed wireless circuitry 436 of the head-wearable apparatus 418 can include short-range transceivers (Bluetooth™) and wireless wide, local, or wide area network transceivers (e.g., cellular or WiFi). Mobile device 414, including the transceivers communicating via the low-power wireless connection 416 and the high-speed wireless connection 420, may be implemented using details of the architecture of the head-wearable apparatus 418, as can other elements of the network 406.

The memory 402 includes any storage device capable of storing various data and applications, including, among other things, camera data generated by the left and right visible light cameras 408, the infrared camera 412, and the image processor 426, as well as images generated for display by the image display driver 424 on the image displays of the image display of optical assembly 422. While the memory 402 is shown as integrated with high-speed circuitry 430, in some examples, the memory 402 may be an independent standalone element of the head-wearable apparatus 418. In certain such examples, electrical routing lines may provide a connection through a chip that includes the high-speed processor 434 from the image processor 426 or the low-power processor 440 to the memory 402. In some examples, the high-speed processor 434 may manage addressing of the memory 402 such that the low-power processor 440 will boot the high-speed processor 434 any time that a read or write operation involving memory 402 is needed.

As shown in FIG. 4, the low-power processor 440 or high-speed processor 434 of the head-wearable apparatus 418 can be coupled to the camera (visible light camera 408, infrared emitter 410, or infrared camera 412), the image display driver 424, the user input device 432 (e.g., touch sensor or push button), and the memory 402.

The head-wearable apparatus 418 is connected to a host computer. For example, the head-wearable apparatus 418 is paired with the mobile device 414 via the high-speed wireless connection 420 or connected to the server system 404 via the network 406. The server system 404 may be one or more computing devices as part of a service or network computing system, for example, that includes a processor, a memory, and network communication interface to communicate over the network 406 with the mobile device 414 and the head-wearable apparatus 418.

The mobile device 414 includes a processor and a network communication interface coupled to the processor. The network communication interface allows for communication over the network 406, low-power wireless connection 416, or high-speed wireless connection 420. Mobile device 414 can further store at least portions of the instructions for generating binaural audio content in the mobile device 414's memory to implement the functionality described herein.

Output components of the head-wearable apparatus 418 include visual components, such as a display such as a liquid crystal display (LCD), a plasma display panel (PDP), a light-emitting diode (LED) display, a projector, or a waveguide. The image displays of the optical assembly are driven by the image display driver 424. The output components of the head-wearable apparatus 418 further include acoustic components (e.g., speakers), haptic components (e.g., a vibratory motor), other signal generators, and so forth. The input components of the head-wearable apparatus 418, the mobile device 414, and server system 404, such as the user input device 432, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 418 may also include additional peripheral device elements. Such peripheral device elements may include biometric sensors, additional sensors, or display elements integrated with the head-wearable apparatus 418. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 416 and high-speed wireless connection 420 from the mobile device 414 via the low-power wireless circuitry 438 or high-speed wireless circuitry 436.

Data Architecture

Figure 5:
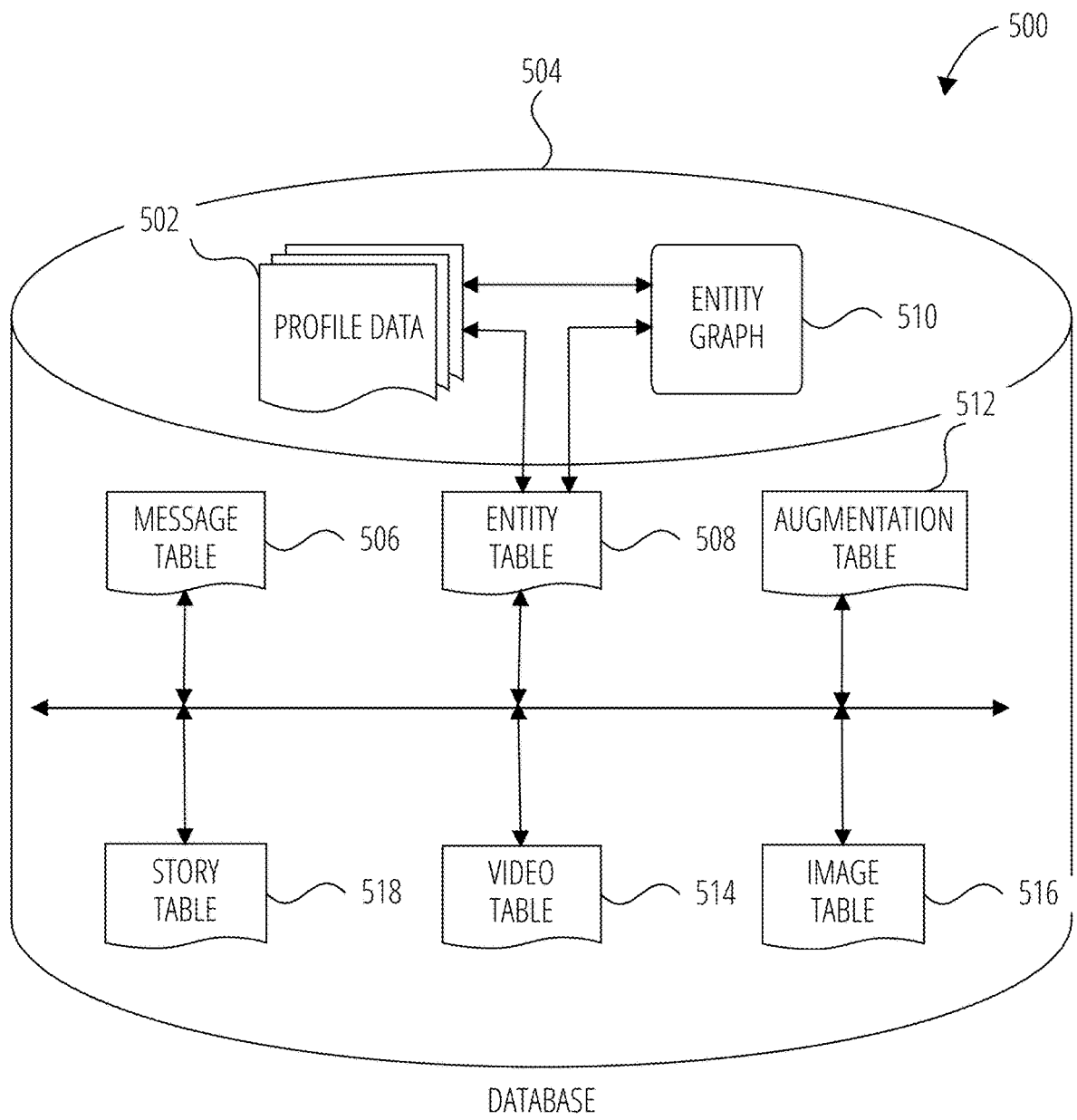
FIG. 5 is a diagrammatic representation of a data structure as maintained in a database, according to some examples.

FIG. 5 is a schematic diagram illustrating data structures 500, which may be stored in the database 504 of the interaction server system 610, according to certain examples. While the content of the database 504 is shown to comprise multiple tables, it will be appreciated that the data could be stored in other types of data structures (e.g., as an object-oriented database).

The database 504 includes message data stored within a message table 506. This message data includes, for any particular message, at least message sender data, message recipient (or receiver) data, and a payload. Further details regarding information that may be included in a message, and included within the message data stored in the message table 506, are described below with reference to FIG. 5.

An entity table 508 stores entity data, and is linked (e.g., referentially) to an entity graph 510 and profile data 502. Entities for which records are maintained within the entity table 508 may include individuals, corporate entities, organizations, objects, places, events, and so forth. Regardless of entity type, any entity regarding which the interaction server system 610 stores data may be a recognized entity. Each entity is provided with a unique identifier, as well as an entity type identifier (not shown).

The entity graph 510 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 600.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 508. Such privacy settings may be applied to all types of relationships within the context of the interaction system 600, or may selectively be applied to only certain types of relationships.

The profile data 502 stores multiple types of profile data about a particular entity. The profile data 502 may be selectively used and presented to other users of the interaction system 600 based on privacy settings specified by a particular entity. Where the entity is an individual, the profile data 502 includes, for example, a username, telephone number, address, settings (e.g., notification and privacy settings), as well as a user-selected avatar representation (or collection of such avatar representations). A particular user may then selectively include one or more of these avatar representations within the content of messages communicated via the interaction system 600, and on map interfaces displayed by interaction clients 604 to other users. The collection of avatar representations may include "status avatars," which present a graphical representation of a status or activity that the user may select to communicate at a particular time.

Where the entity is a group, the profile data 502 for the group may similarly include one or more avatar representations associated with the group, in addition to the group name, members, and various settings (e.g., notifications) for the relevant group.

The database 504 also stores augmentation data, such as overlays or filters, in an augmentation table 512. The augmentation data is associated with and applied to videos (for which data is stored in a video table 514) and images (for which data is stored in an image table 516).

Filters, in some examples, are overlays that are displayed as overlaid on an image or video during presentation to a message receiver. Filters may be of various types, including user-selected filters from a set of filters presented to a message sender by the interaction client 604 when the message sender is composing a message. Other types of filters include geolocation filters (also known as geo-filters), which may be presented to a message sender based on geographic location. For example, geolocation filters specific to a neighborhood or special location may be presented within a user interface by the interaction client 604, based on geolocation information determined by a Global Positioning System (GPS) unit of the computing system 602.

Another type of filter is a data filter, which may be selectively presented to a message sender by the interaction client 604 based on other inputs or information gathered by the computing system 602 during the message creation process. Examples of data filters include current temperature at a specific location, a current speed at which a message sender is traveling, battery life for a computing system 602, or the current time.

Other augmentation data that may be stored within the image table 516 includes augmented reality content items (e.g., corresponding to applying Lenses or augmented reality experiences). An augmented reality content item may be a real-time special effect and sound that may be added to an image or a video.

As described above, augmentation data includes augmented reality (AR), virtual reality (VR) and mixed reality (MR) content items, overlays, image transformations, images, and modifications that may be applied to image data (e.g., videos or images). This includes real-time modifications, which modify an image as it is captured using device sensors (e.g., one or multiple cameras) of the computing system 602 and then displayed on a screen of the computing system 602 with the modifications. This also includes modifications to stored content, such as video clips in a collection or group that may be modified. For example, in a computing system 602 with access to multiple augmented reality content items, a user can use a single video clip with multiple augmented reality content items to see how the different augmented reality content items will modify the stored clip. Similarly, real-time video capture may use modifications to show how video images currently being captured by sensors of a computing system 602 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, visual features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

A transformation system can capture an image or video stream on a client device (e.g., the computing system 602)

and perform complex image manipulations locally on the computing system 602 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the computing system 602.

In some examples, a computer animation model to transform image data can be used by a system where a user may capture an image or video stream of the user (e.g., a selfie) using the computing system 602 having a neural network operating as part of an interaction client 604 operating on the computing system 602. The transformation system operating within the interaction client 604 determines the presence of a face within the image or video stream and provides modification icons associated with a computer animation model to transform image data, or the computer animation model can be present as associated with an interface described herein. The modification icons include changes that are the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the computing system 602 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browsing to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 518 stores data regarding collections of messages and associated image, video, or audio data, which are compiled into a collection (e.g., a story or a gallery). The creation of a particular collection may be initiated by a particular user (e.g., each user for which a record is maintained in the entity table 508). A user may create a "personal story" in the form of a collection of content that has been created and sent/broadcast by that user. To this end, the user interface of the interaction client 604 may include an icon that is user-selectable to enable a message sender to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 604, to contribute content to a particular live story. The live story may be identified to the user by the interaction client 604, based on his or her location. The end result is a "live story" told from a community perspective.

A further type of content collection is known as a "location story," which enables a user whose computing system 602 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 514 stores video data that, in some examples, is associated with messages for which records are maintained within the message table 506. Similarly, the image table 516 stores image data associated with messages for which message data is stored in the entity table 508. The entity table 508 may associate various augmentations from the augmentation table 512 with various images and videos stored in the image table 516 and the video table 514.

The databases 504 also includes entity relationship information collected by the entity relationship system 722.

Networked Computing Environment

Figure 6:
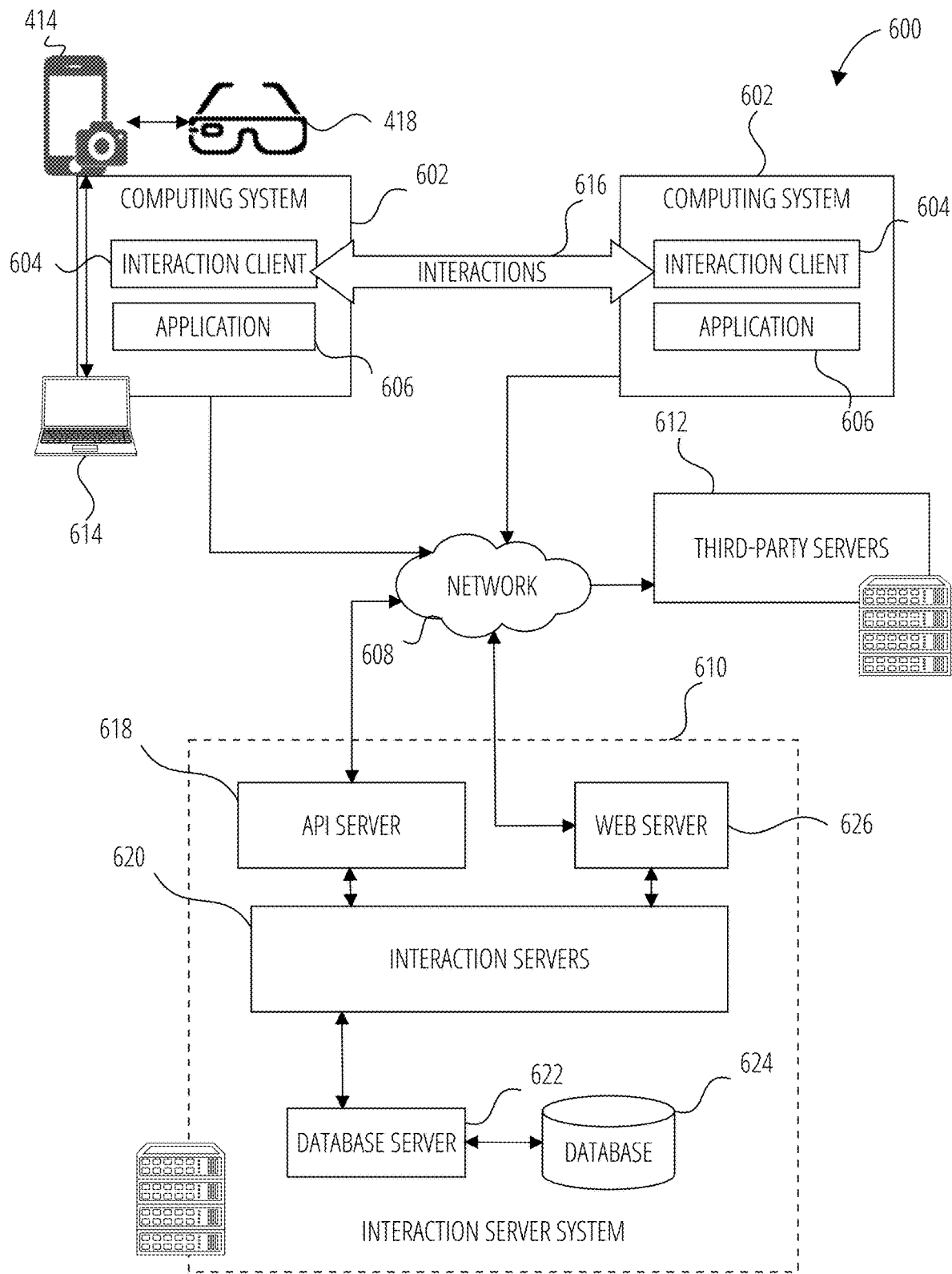
FIG. 6 is a diagrammatic representation of a networked environment in which the present disclosure may be deployed, according to some examples.

FIG. 6 is a block diagram showing an example interaction system 600 for facilitating interactions (e.g., exchanging text messages, conducting text audio and video calls, or playing games) over a network. The interaction system 600 includes multiple computing systems 602, each of which hosts multiple applications, including an interaction client 604 and other applications 606. Each interaction client 604 is communicatively coupled, via one or more communication networks including a network 608 (e.g., the Internet), to other instances of the interaction client 604 (e.g., hosted on respective other computing systems 602), an interaction server system 610 and third-party servers 612). An interaction client 604 can also communicate with locally hosted applications 606 using Applications Program Interfaces (APIs).

Each computing system 602 may comprise one or more user devices, such as a mobile device 414, head-wearable apparatus 418, and a computer client device 614 that are communicatively connected to exchange data and messages.

An interaction client 604 interacts with other interaction clients 604 and with the interaction server system 610 via the network 608. The data exchanged between the interaction clients 604 (e.g., interactions 616) and between the interaction clients 604 and the interaction server system 610 includes functions (e.g., commands to invoke functions) and payload data (e.g., text, audio, video, or other multimedia data).

The interaction server system 610 provides server-side functionality via the network 608 to the interaction clients 604. While certain functions of the interaction system 600 are described herein as being performed by either an interaction client 604 or by the interaction server system 610, the location of certain functionality either within the interaction client 604 or the interaction server system 610 may be a design choice. For example, it may be technically preferable to initially deploy particular technology and functionality within the interaction server system 610 but to later migrate this technology and functionality to the interaction client 604 where a computing system 602 has sufficient processing capacity.

The interaction server system 610 supports various services and operations that are provided to the interaction clients 604. Such operations include transmitting data to, receiving data from, and processing data generated by the interaction clients 604. This data may include message content, client device information, geolocation information, media augmentation and overlays, message content persistence conditions, entity relationship information, and live event information. Data exchanges within the interaction system 600 are invoked and controlled through functions available via user interfaces (UIs) of the interaction clients 604.

Turning now specifically to the interaction server system 610, an Application Program Interface (API) server 618 is coupled to and provides programmatic interfaces to Interaction servers 620, making the functions of the Interaction servers 620 accessible to interaction clients 604, other applications 606 and third-party server 612. The Interaction servers 620 are communicatively coupled to a database server 622, facilitating access to a database 624 that stores data associated with interactions processed by the Interaction servers 620. Similarly, a web server 626 is coupled to the Interaction servers 620 and provides web-based interfaces to the Interaction servers 620. To this end, the web server 626 processes incoming network requests over the Hypertext Transfer Protocol (HTTP) and several other related protocols.

The Application Program Interface (API) server 618 receives and transmits interaction data (e.g., commands and message payloads) between the Interaction servers 620 and the computing systems 602 (and, for example, interaction clients 604 and other application 606) and the third-party server 612. Specifically, the Application Program Interface (API) server 618 provides a set of interfaces (e.g., routines and protocols) that can be called or queried by the interaction client 604 and other applications 606 to invoke functionality of the Interaction servers 620. The Application Program Interface (API) server 618 exposes various functions supported by the Interaction servers 620, including account registration; login functionality; the sending of interaction data, via the Interaction servers 620, from a particular interaction client 604 to another interaction client 604; the communication of media files (e.g., images or video) from an interaction client 604 to the Interaction servers 620; the settings of a collection of media data (e.g., a story); the retrieval of a list of friends of a user of a computing system 602; the retrieval of messages and content; the addition and deletion of entities (e.g., friends) to an entity graph (e.g., a social graph); the location of friends within an entity graph; and opening an application event (e.g., relating to the interaction client 604).

The Interaction servers 620 host multiple systems and subsystems, described below with reference to FIG. 7.

Linked Applications

Returning to the interaction client 604, features and functions of an external resource (e.g., a linked application 606 or applet) are made available to a user via an interface of the interaction client 604. In this context, "external" refers to the fact that the application 606 or applet is external to the interaction client 604. The external resource is often provided by a third party but may also be provided by the creator or provider of the interaction client 604. The interaction client 604 receives a user selection of an option to launch or access features of such an external resource. The external resource may be the application 606 installed on the computing system 602 (e.g., a "native app"), or a small-scale version of the application (e.g., an "applet") that is hosted on the computing system 602 or remote of the computing system 602 (e.g., on third-party servers 612). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 604. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 604 determines whether the selected external resource is a web-based external resource or a locally-installed application 606. In some cases, applications 606 that are locally installed on the computing system 602 can be launched independently of and separately from the interaction client 604, such as by selecting an icon corresponding to the application 606 on a home screen of the computing system 602. Small-scale versions of such applications can be launched or accessed via the interaction client 604 and, in some examples, no or limited portions of the small-scale application can be accessed outside of the interaction client 604. The small-scale application can be launched by the interaction client 604 receiving, from a third-party server 612 for example, a markup-language document associated with the small-scale application and processing such a document.

In response to determining that the external resource is a locally-installed application 606, the interaction client 604 instructs the computing system 602 to launch the external resource by executing locally-stored code corresponding to the external resource. In response to determining that the external resource is a web-based resource, the interaction client 604 communicates with the third-party servers 612 (for example) to obtain a markup-language document corresponding to the selected external resource. The interaction client 604 then processes the obtained markup-language document to present the web-based external resource within a user interface of the interaction client 604.

The interaction client 604 can notify a user of the computing system 602, or other users related to such a user (e.g., "friends"), of activity taking place in one or more external resources. For example, the interaction client 604 can provide participants in a conversation (e.g., a chat session) in the interaction client 604 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 604, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 604. The external resource can selectively include different media items in the responses, based on a current context of the external resource.

The interaction client 604 can present a list of the available external resources (e.g., applications 606 or applets) to a user to launch or access a given external resource. This list can be presented in a context-sensitive menu. For example, the icons representing different ones of the application 606 (or applets) can vary based on how the menu is launched by the user (e.g., from a conversation interface or from a non-conversation interface).

System Architecture

Figure 7:
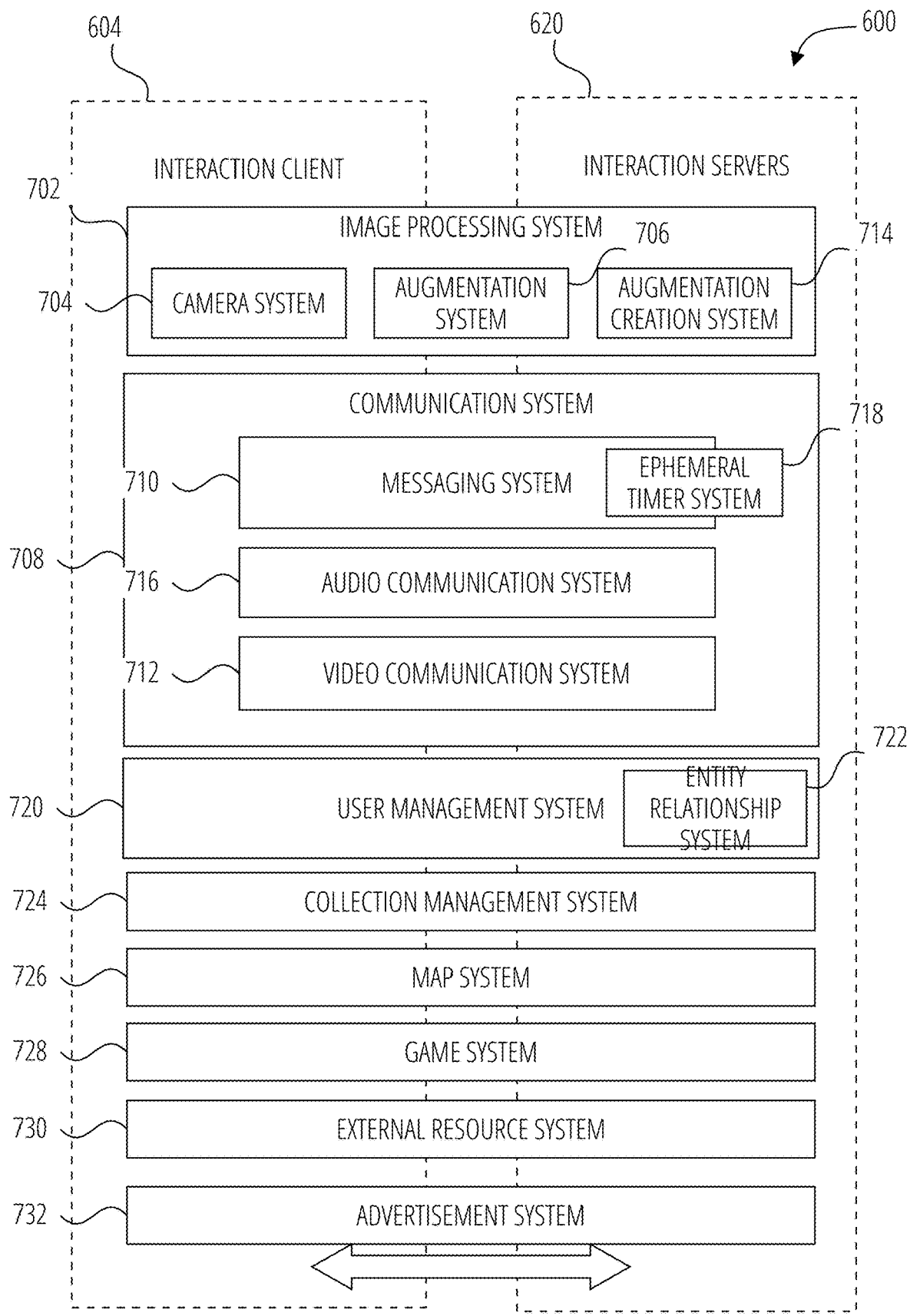
FIG. 7 is a diagrammatic representation of a messaging system, according to some examples, that has both client-side and server-side functionality.

FIG. 7 is a block diagram illustrating further details regarding the interaction system 600, according to some examples. Specifically, the interaction system 600 is shown to comprise the interaction client 604 and the Interaction servers 620. The interaction system 600 embodies multiple subsystems, which are supported on the client-side by the interaction client 604 and on the server-side by the Interaction servers 620. Example subsystems are discussed below.

An image processing system 702 provides various functions that enable a user to capture and augment (e.g., augment or otherwise modify or edit) media content associated with a message.

A camera system 704 includes control software (e.g., in a camera application) that interacts with and controls hardware camera hardware (e.g., directly or via operating system controls) of the computing system 602 to modify and augment real-time images captured and displayed via the interaction client 604.

The augmentation system 706 provides functions related to the generation and publishing of augmentations (e.g., media overlays) for images captured in real-time by cameras of the computing system 602 or retrieved from memory of the computing system 602. For example, the augmentation system 706 operatively selects, presents, and displays media overlays (e.g., an image filter or an image lens) to the interaction client 604 for the augmentation of real-time images received via the camera system 704 or stored images retrieved from memory 402 of a computing system 602. These augmentations are selected by the augmentation system 706 and presented to a user of an interaction client 604, based on a number of inputs and data, such as for example:

Geolocation of the computing system 602; and

Entity relationship information of the user of the computing system 602.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at computing system 602 for communication in a message, or applied to video content, such as a video content stream or feed transmitted from an interaction client 604. As such, the image processing system 702 may interact with, and support, the various subsystems of the communication system 708, such as the messaging system 710 and the video communication system 712.

A media overlay may include text or image data that can be overlaid on top of a photograph taken by the computing system 602 or a video stream produced by the computing system 602. In some examples, the media overlay may be a location overlay (e.g., Venice beach), a name of a live event, or a name of a merchant overlay (e.g., Beach Coffee House). In further examples, the image processing system 702 uses the geolocation of the computing system 602 to identify a media overlay that includes the name of a merchant at the geolocation of the computing system 602. The media overlay may include other indicia associated with the merchant. The media overlays may be stored in the databases 624 and accessed through the database server 622.

The image processing system 702 provides a user-based publication platform that enables users to select a geolocation on a map and upload content associated with the selected geolocation. The user may also specify circumstances under which a particular media overlay should be offered to other users. The image processing system 702 generates a media overlay that includes the uploaded content and associates the uploaded content with the selected geolocation.

The augmentation creation system 714 supports augmented reality developer platforms and includes an application for content creators (e.g., artists and developers) to create and publish augmentations (e.g., augmented reality experiences) of the interaction client 604. The augmentation creation system 714 provides a library of built-in features and tools to content creators including, for example custom shaders, re-lighting, tracking technology, and templates.

In some examples, the augmentation creation system 714 provides a merchant-based publication platform that enables merchants to select a particular augmentation associated with a geolocation via a bidding process. For example, the augmentation creation system 714 associates a media overlay of the highest bidding merchant with a corresponding geolocation for a predefined amount of time.

A communication system 708 is responsible for enabling and processing multiple forms of communication and interaction within the interaction system 600 and includes a messaging system 710, an audio communication system 716, and a video communication system 712. The messaging system 710 is responsible for enforcing the temporary or time-limited access to content by the interaction clients 604. The messaging system 710 incorporates multiple timers (e.g., within an ephemeral timer system 718) that, based on duration and display parameters associated with a message or collection of messages (e.g., a story), selectively enable access (e.g., for presentation and display) to messages and associated content via the interaction client 604. Further details regarding the operation of the ephemeral timer system 718 are provided below. The audio communication system 716 enables and supports audio communications (e.g., real-time audio chat) between multiple interaction clients 604. Similarly, the video communication system 712 enables and supports video communications (e.g., real-time video chat) between multiple interaction clients 604.

A user management system 720 is operationally responsible for the management of user data and profiles, and includes an entity relationship system 722 that maintains entity relationship information regarding relationships between users of the interaction system 600.

A collection management system 724 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 724 may also be responsible for publishing an icon that provides notification of a particular collection to the user interface of the interaction client 604. The collection management system 724 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 724 employs machine vision (or image recognition technology) and content rules to curate a content collection automatically. In certain examples, compensation may be paid to a user to include user-generated content into a collection. In such cases, the collection management system 724 operates to automatically make payments to such users to use their content.

A map system 726 provides various geographic location functions and supports the presentation of map-based media content and messages by the interaction client 604. For example, the map system 726 enables the display of user icons or avatars (e.g., stored in profile data 502) on a map to indicate a current or past location of "friends" of a user, as well as media content (e.g., collections of messages including photographs and videos) generated by such friends, within the context of a map. For example, a message posted by a user to the interaction system 600 from a specific geographic location may be displayed within the context of a map at that particular location to "friends" of a specific user on a map interface of the interaction client 604. A user can furthermore share his or her location and status information (e.g., using an appropriate status avatar) with other users of the interaction system 600 via the interaction client 604, with this location and status information being similarly displayed within the context of a map interface of the interaction client 604 to selected users.

A game system 728 provides various gaming functions within the context of the interaction client 604. The interaction client 604 provides a game interface providing a list of available games that can be launched by a user within the context of the interaction client 604 and played with other users of the interaction system 600. The interaction system 600 further enables a particular user to invite other users to participate in the play of a specific game by issuing invitations to such other users from the interaction client 604. The interaction client 604 also supports audio, video, and text messaging (e.g., chats) within the context of gameplay, provides a leaderboard for the games, and also supports the provision of in-game rewards (e.g., coins and items).

An external resource system 730 provides an interface for the interaction client 604 to communicate with remote servers (e.g., third-party servers 612) to launch or access external resources, i.e., applications or applets. Each third-party server 612 hosts, for example, a markup language (e.g., HTML5) based application or a small-scale version of an application (e.g., game, utility, payment, or ride-sharing application). The interaction client 604 may launch a web-based resource (e.g., application) by accessing the HTML5 file from the third-party servers 612 associated with the web-based resource. Applications hosted by third-party servers 612 are programmed in JavaScript leveraging a Software Development Kit (SDK) provided by the Interaction servers 620. The SDK includes Application Programming Interfaces (APIs) with functions that can be called or invoked by the web-based application. The Interaction servers 620 host a JavaScript library that provides a given external resource access to specific user data of the interaction client 604. HTML5 is an example of technology for programming games, but applications and resources programmed based on other technologies can be used.

To integrate the functions of the SDK into the web-based resource, the SDK is downloaded by the third-party server 612 from the Interaction servers 620 or is otherwise received by the third-party server 612. Once downloaded or received, the SDK is included as part of the application code of a web-based external resource. The code of the web-based resource can then call or invoke certain functions of the SDK to integrate features of the interaction client 604 into the web-based resource.

The SDK stored on the interaction server system 610 effectively provides the bridge between an external resource (e.g., applications 606 or applets) and the interaction client 604. This gives the user a seamless experience of communicating with other users on the interaction client 604 while also preserving the look and feel of the interaction client 604. To bridge communications between an external resource and an interaction client 604, the SDK facilitates communication between third-party servers 612 and the interaction client 604. A WebViewJavaScriptBridge running on a computing system 602 establishes two one-way communication channels between an external resource and the interaction client 604. Messages are sent between the external resource and the interaction client 604 via these communication channels asynchronously. Each SDK function invocation is sent as a message and callback. Each SDK function is implemented by constructing a unique callback identifier and sending a message with that callback identifier.

By using the SDK, not all information from the interaction client 604 is shared with third-party servers 612. The SDK limits which information is shared based on the needs of the external resource. Each third-party server 612 provides an HTML5 file corresponding to the web-based external resource to Interaction servers 620. The Interaction servers 620 can add a visual representation (such as a box art or other graphic) of the web-based external resource in the interaction client 604. Once the user selects the visual representation or instructs the interaction client 604 through a GUI of the interaction client 604 to access features of the web-based external resource, the interaction client 604 obtains the HTML5 file and instantiates the resources to access the features of the web-based external resource.

The interaction client 604 presents a graphical user interface (e.g., a landing page or title screen) for an external resource. During, before, or after presenting the landing page or title screen, the interaction client 604 determines whether the launched external resource has been previously authorized to access user data of the interaction client 604. In response to determining that the launched external resource has been previously authorized to access user data of the interaction client 604, the interaction client 604 presents another graphical user interface of the external resource that includes functions and features of the external resource. In response to determining that the launched external resource has not been previously authorized to access user data of the interaction client 604, after a threshold period of time (e.g., 3 seconds) of displaying the landing page or title screen of the external resource, the interaction client 604 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 604 adds the external resource to a list of authorized external resources and allows the external resource to access user data from the interaction client 604. The external resource is authorized by the interaction client 604 to access the user data under an OAuth 2 framework.

The interaction client 604 controls the type of user data that is shared with external resources based on the type of external resource being authorized. For example, external resources that include full-scale applications (e.g., an application 606) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 732 operationally enables the purchasing of advertisements by third parties for presentation to end-users via the interaction clients 604 and also handles the delivery and presentation of these advertisements.

Software Architecture

Figure 8:
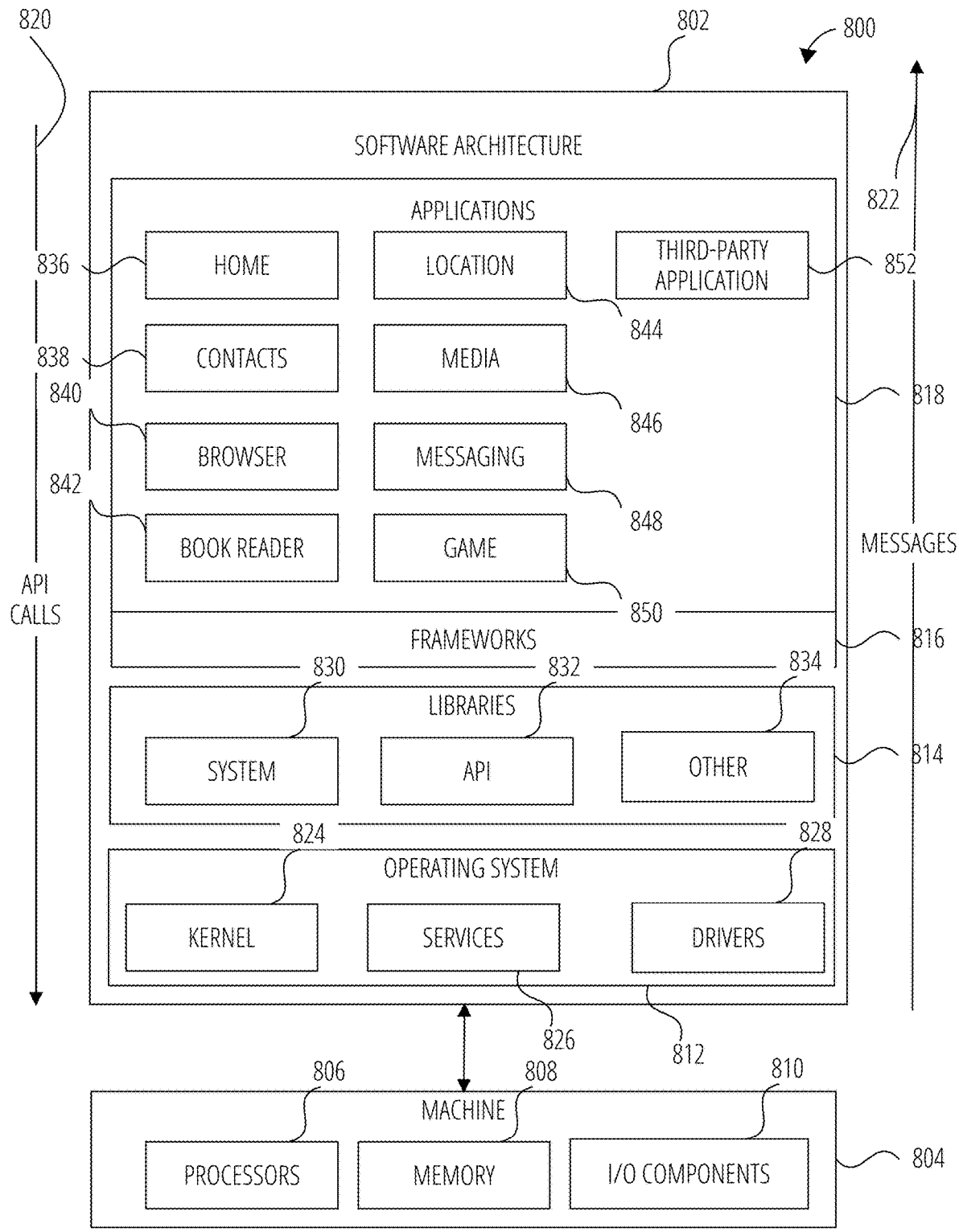
FIG. 8 is a block diagram showing a software architecture within which examples may be implemented.

FIG. 8 is a block diagram 800 illustrating a software architecture 802, which can be installed on any one or more of the devices described herein. The software architecture 802 is supported by hardware such as a machine 804 that includes processors 806, memory 808, and I/O components 810. In this example, the software architecture 802 can be conceptualized as a stack of layers, where each layer provides a particular functionality. The software architecture 802 includes layers such as an operating system 812, libraries 814, frameworks 816, and applications 818. Operationally, the applications 818 invoke API calls 820 through the software stack and receive messages 822 in response to the API calls 820.

The operating system 812 manages hardware resources and provides common services. The operating system 812 includes, for example, a kernel 824, services 826, and drivers 828. The kernel 824 acts as an abstraction layer between the hardware and the other software layers. For example, the kernel 824 provides memory management, processor management (e.g., scheduling), component management, networking, and security settings, among other functionalities. The services 826 can provide other common services for the other software layers. The drivers 828 are responsible for controlling or interfacing with the underlying hardware. For instance, the drivers 828 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 814 provide a common low-level infrastructure used by the applications 818. The libraries 814 can include system libraries 830 (e.g., C standard library) that provide functions such as memory allocation functions, string manipulation functions, mathematic functions, and the like. In addition, the libraries 814 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 814 can also include a wide variety of other libraries 834 to provide many other APIs to the applications 818.

The frameworks 816 provide a common high-level infrastructure that is used by the applications 818. For example, the frameworks 816 provide various graphical user interface (GUI) functions, high-level resource management, and high-level location services. The frameworks 816 can provide a broad spectrum of other APIs that can be used by the applications 818, some of which may be specific to a particular operating system or platform.

In an example, the applications 818 may include a home application 836, a contacts application 838, a browser application 840, a book reader application 842, a location application 844, a media application 846, a messaging application 848, a game application 850, and a broad assortment of other applications such as a third-party application 852. The applications 818 are programs that execute functions defined in the programs. Various programming languages can be employed to create one or more of the applications 818, structured in a variety of manners, such as object-oriented programming languages (e.g., Objective-C, Java, or C++) or procedural programming languages (e.g., C or assembly language). In a specific example, the third-party application 852 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 852 can invoke the API calls 820 provided by the operating system 812 to facilitate functionalities described herein.

CONCLUSION

Changes and modifications may be made to the disclosed examples without departing from the scope of the present disclosure. These and other changes or modifications are intended to be included within the scope of the present disclosure, as expressed in the following claims.

Glossary

"Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Machine-readable storage medium" refers to both machine-storage media and transmission media. Thus, the terms include both storage devices/media and carrier waves/modulated data signals. The terms "computer-readable medium," "machine-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory machine-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A computer-implemented method comprising:
   receiving, by a set of processors, 3D data of a hand;
   generating, by the set of processors, a 3D model of the hand using the 3D data, the 3D model comprising a set of surfaces;
   generating, by the set of processors, target normal training data comprising a set of normals of the set of surfaces of the 3D model;
   generating, by the set of processors, synthetic 2D image training data comprising a set of synthetic 2D images using the 3D model, the set of normals, and combinations of lighting levels, lighting angles, camera angles, and camera distances; and
   training, by the set of processors, a normal estimation model using the synthetic 2D image training data and the target normal training data.

2. The computer-implemented method of claim 1, wherein generating the synthetic 2D image training data is further using a set of camera and lighting parameters.

3. The computer-implemented method of claim 2, wherein the set of camera and lighting parameters comprise randomized values.

4. The computer-implemented method of claim 1, wherein training the normal estimation model comprises:
   determining a set of cropping boundaries using the synthetic 2D image training data and a detection model; and
   cropping the set of synthetic 2D images using the set of cropping boundaries.

5. The computer-implemented method of claim 1,
   wherein the synthetic 2D image training data comprises a set of pixels, and
   wherein the set of normals comprises a respective normal for each pixel of the set of pixels.

6. The computer-implemented method of claim 1, further comprising:
   capturing, by a second set of processors, image data of a second hand;
   generating, by the second set of processors, a set of estimated normals using the image data and the normal estimation model;
   generating, by the second set of processors, augmented image data using the set of estimated normals and the image data; and
   providing, by the second set of processors, an augmented image to a user in a user interface using the augmented image data.

7. The computer-implemented method of claim 6, wherein generating the set of estimated normals comprises:
   determining, by the second set of processors, a set of cropping boundaries using the image data and a detection model; and
   cropping, by the second set of processors, the image data using the set of cropping boundaries.

8. The computer-implemented method of claim 6,
   wherein the image data of the second hand comprises a set of pixels, and
   wherein the set of estimated normals comprises a respective normal for each pixel of the set of pixels.

9. A machine comprising:
   one or more processors; and
   a memory storing instructions that, when executed by the one or more processors, cause the machine to perform operations comprising:
   receiving 3D data of a hand;

generating a 3D model of the hand using the 3D data, the 3D model comprising a set of surfaces;
generating target normal training data comprising a set of normals of the set of surfaces of the 3D model;
generating synthetic 2D image training data comprising a set of synthetic 2D images using the 3D model, the set of normals, and combinations of lighting levels, lighting angles, camera angles, and camera distances; and
training a normal estimation model using the synthetic 2D image training data and the target normal training data.

10. The machine of claim 9, wherein generating the synthetic 2D image training data is further using a set of camera and lighting parameters.

11. The machine of claim 10, wherein the set of camera and lighting parameters comprise randomized values.

12. The machine of claim 9, wherein training the normal estimation model comprises:
determining a set of cropping boundaries using the synthetic 2D image training data and a detection model; and
cropping the set of synthetic 2D images using the set of cropping boundaries.

13. The machine of claim 9,
wherein the synthetic 2D image training data comprises a set of pixels, and
wherein the set of normals comprises a respective normal for each pixel of the set of pixels.

14. An interactive system comprising:
one or more processors; and
a memory storing instructions that, when executed by the one or more processors, cause the interactive system to perform operations comprising:
capturing, using a camera of the interactive system, image data of a first hand;
generating a set of estimated normals using the image data and a normal estimation model trained using operations comprising:
generating target normal training data comprising a set of normals of a set of surfaces of a 3D model of a second hand;
generating synthetic 2D image training data comprising a set of synthetic 2D images using the 3D model, the set of normals, and combinations of lighting levels, lighting angles, camera angles, and camera distances; and
training the normal estimation model using the synthetic 2D image training data and the target normal training data;
generating augmented image data using the set of estimated normals and the image data; and
providing an augmented image to a user in a user interface using the augmented image data.

15. The interactive system of claim 14, wherein generating the set of estimated normals comprises:
determining a set of cropping boundaries using the image data and a detection model; and
cropping the image data using the set of cropping boundaries.

16. The interactive system of claim 14,
wherein the image data of the hand comprises a set of pixels, and
wherein the set of estimated normals comprises a respective normal for each pixel of the set of pixels.

17. A non-transitory computer-readable storage medium, the computer-readable storage medium including instructions that when executed by a computer, cause the computer to perform operations comprising:
receiving 3D data of a hand;
generating a 3D model of the hand using the 3D data, the 3D model comprising a set of surfaces;
generating target normal training data comprising a set of normals of the set of surfaces of the 3D model;
generating synthetic 2D image training data comprising a set of synthetic 2D images using the 3D model, the set of normals, and combinations of lighting levels, lighting angles, camera angles, and camera distances; and
training a normal estimation model using the synthetic 2D image training data and the target normal training data.

18. The computer-readable storage medium of claim 17, wherein generating the synthetic 2D image training data is further using a set of camera and lighting parameters.

19. The computer-readable storage medium of claim 18, wherein the set of camera and lighting parameters comprise randomized values.

20. The computer-readable storage medium of claim 17, wherein training the normal estimation model comprises:
determining a set of cropping boundaries using the synthetic 2D image training data and a detection model; and
cropping the set of synthetic 2D images using the set of cropping boundaries.

* * * * *